Jan. 9, 1951  J. B. STEIDING  2,537,170
TESTING DEVICE FOR FILAMENTARY MATERIALS
Filed Jan. 10, 1947  2 Sheets-Sheet 1
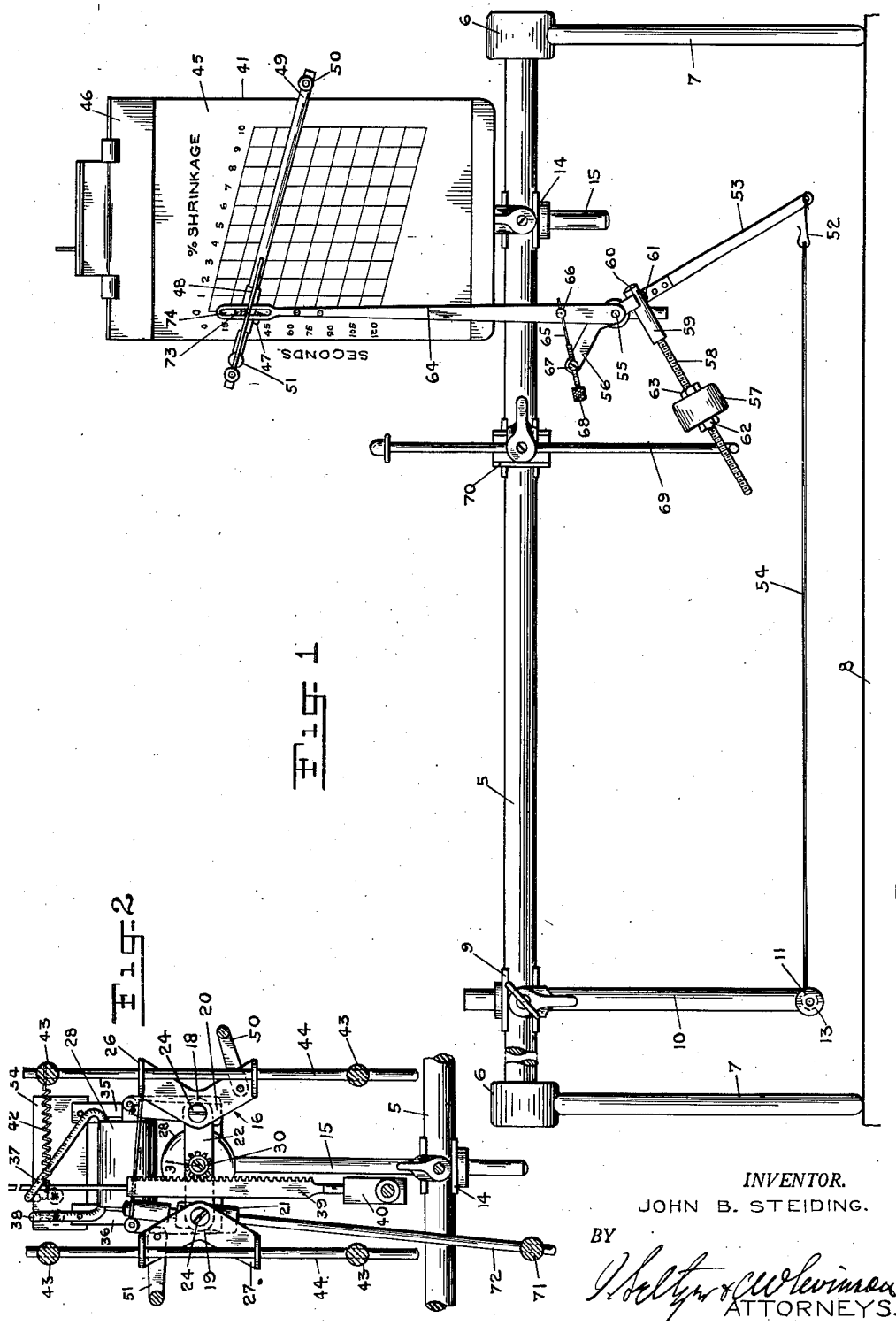
INVENTOR.
JOHN B. STEIDING.
BY
ATTORNEYS.

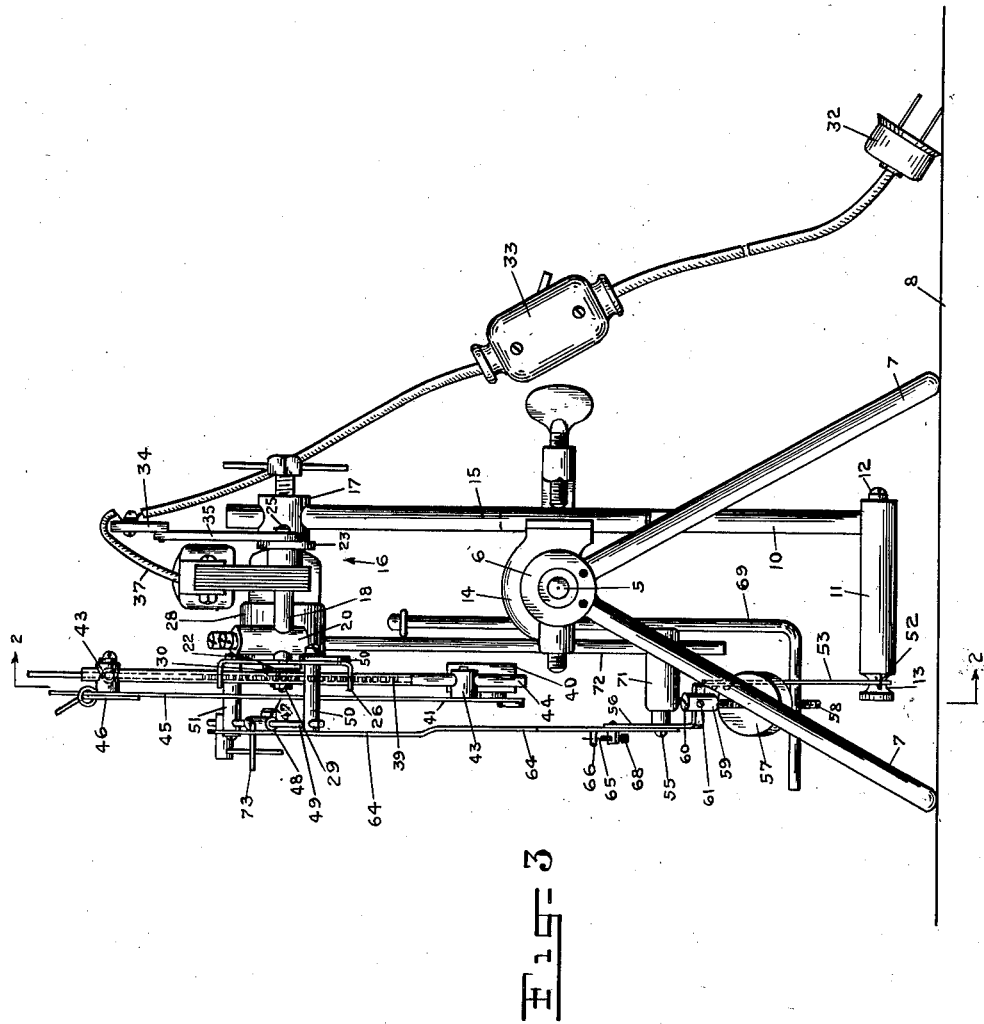

Patented Jan. 9, 1951

2,537,170

UNITED STATES PATENT OFFICE 2,537,170

TESTING DEVICE FOR FILAMENTARY MATERIALS

John B. Steiding, Midland, Md., assignor to Celanese Corporation of America, a corporation of Delaware Application January 10, 1947, Serial No. 721,223

3 Claims. (Cl. 73—95)

This invention relates to testing device and relates more particularly to a novel testing and recording device adapted to indicate and record the linear behavior of filamentary materials, such as yarns or threads, when subjected to various textile treatments.

An object of this invention is the provision of an improved testing and recording device for testing yarns or threads under a predetermined, variable tension and to record the linear response of said yarns or threads to said test conditions.

Another object of this invention is to provide a sensitive testing and recording device for use with yarns or threads which is adapted to indicate and record any relative change in the length of the yarn or thread under test with respect to elapsed time of treatment, as the yarn or thread is subjected to treatment in various media having a physical or chemical action thereon.

Other objects of this invention will appear from the following detailed description and the accompanying drawing.

In the drawing, wherein the preferred embodiment of my invention is shown,

Fig. 1 is a front-elevational view of my novel testing and recording device showing the yarn or thread in testing position and the chart upon which the linear response of said yarn or thread is recorded.

Fig. 2 is also a detail view of said testing and recording device, taken along line 2—2 in Fig. 3, showing the means provided for operating the chart drive mechanism, and Fig. 3 is an end view of said testing and recording device looking from right to left.

Like reference numerals indicate like parts throughout the several views of the drawing.

Referring now to the drawing and more particularly to Fig. 1, there is shown a main supporting rod 5 set in hubs 6 which are provided with legs 7, thus forming a rigid stand which enables the device supported thereon to be placed conveniently on any suitable supporting base 8. Mounted at one end of rod 5 by means of a clamp 9 is a depending rod 10 supporting at right angles thereto a short rod 11 which is attached thereto by means of a screw 12. Rod 11 is shaped at one end to form a circumferential groove 13, the purpose of which will be hereinafter described. Rigidly fixed to the opposite end of rod 5, by means of a clamp 14, is a rod 15 parallel to rod 10.

Slidably mounted on rod 15, as shown in Figs. 2 and 3, is a bracket generally indicated by reference numeral 16 and held in the desired position thereon by means of a screw clamp 17. Bracket 16 comprises a pair of substantially parallel horizontal rods 18 and 19 integral with a pair of substantially upright rods 20 and 21. Rods 18 and 19 are spaced apart by means of a front plate 22 and a rear plate 23. Front plate 22 is held in position by screws 24 threaded into rods 18 and 19 and the rear plate 23 is held in position by screws 25, only one of which is shown. Bracket 16 also carries a pair of arms 26 and 27 secured thereto by said screws 24.

Rigidly mounted on bracket assembly 16 is an electric motor 28 provided with a drive shaft 29 having a pinion 30 keyed thereto and held in position by a screw 31. The power connections to electric motor 28 comprise a two-pronged plug 32 wired to a snap switch 33 which in turn is connected to a panel board 34, formed of a nonconducting insulating material, which is mounted on arms 35 and 36. Leads 37 and 38 from panel board 34 are connected to the motor. The switch 33 controls the flow of power to and the operation of electric motor 28. With power being supplied to motor 28, pinion 30 will be rotated at a uniform angular velocity. The speed of rotation is governed by suitable internal gearing (not shown).

Pinion 30 meshes with a rack 39 which is attached at its lower end to a bar 40 which is mounted on a chart board 41. The upper end of rack 39 is spring loaded, employing a suitable spring 42, so that rack 39 will be maintained in constant engagement with pinion 30 but may be easily disengaged therefrom for re-setting. The rear of chart board 41 has a plurality of short rods 43 fixed thereto which are drilled through their diameter to receive a pair of parallel vertical rods 44, the latter being held in fixed position therein. Rods 44 are slidably mounted in arms 26 and 27. When power is supplied to the electric motor 28, the rotation of pinion 30 causes rack 39 to move in an upward direction and this movement lifts chart board 41 and also a chart 45 which is detachably secured thereto by means of a spring clip 46.

A record of the vertical movement of chart 45 is normally made by a pen 47 carried by a sleeve 48 slidably mounted on a fixed guide rod 49. Rod 49 is attached at one end to an arm 50 and at the other to an arm 51, which arms are fixed to arms 26 and 27, respectively of bracket assembly 16.

A hook 52 pivotally attached to a lever arm 53 is provided over which a standard length of yarn 54 is passed, the other end being looped about circumferential groove 13 on rod 11. Lever arm 53 pivots about a supporting fulcrum 55 and has an extension arm 56 integral therewith. Yarn 54 may be loaded to any desired tension by means of a counterweight 57 carried on a threaded rod 58 set in a socket 59 which is bifurcated at 60 so as to be detachably secured to lever arm 53 by means of a screw 61. Counterweight 57 is adjustable along arm 58 and may be held in any desired position by means of lock nuts 62 and 63. A pointer arm 64 is also mounted on supporting fulcrum 55 and is rigidly connected to extension arm 56 by means of a thin rod 65 so that said pointer arm 64 will move as a unit with lever arm 54. One end of rod 65 is fixed to a short pin 66 integral with pointer arm 64 and the other end is threaded through a screw 67 attached to arm 56. The threaded portion of rod 65 is provided with a knurled knob 68 and a close adjustment may be made in the angle between pointer arm 64 and extension arm 56 by suitably rotating said knurled knob.

Safety means are provided to arrest the fall of counterweight 57 in the event of a failure of yarn 54 so as to prevent injury to the mechanism. The safety means comprises a bent rod 69 adjustably mounted on rod 5 by means of a clamp 70 and turned so that the horizontal portion will pass under threaded rod 58. Should yarn 54 fail, rod 69 will immediately arrest the downward movement of counterweight 57 and rod 58 and prevent injury to any portion of the delicate recording mechanism. The entire lever arm and counterweight assembly is supported by a horizontally disposed cylindrical arm 71 carried by a vertical rod 72 which is mounted in rod 21 of bracket assembly 16.

The test of the yarn or thread specimen is carried out in the following manner:

With yarn specimen 54 in position between groove 13 and hook 52, as described, counterweight 57 is adjusted along threaded rod 58 to place the desired tension load on said yarn and nuts 62 and 63 are locked in position. Rack 39 is disengaged from pinion 30 and chart 45 dropped so that pen 47 will register on zero elapsed time. Knurled knob 68 is then rotated, if necessary, to place lever arm 64 and pen 47 at a zero horizontal position. Yarn specimen 54 is then immersed in the desired test bath (not shown) and simultaneously therewith switch 33 is closed to allow electric motor 28 to function. The pinion 30 is rotated by drive shaft 29 and the motion causes chart board 41 and chart 45 to be lifted slowly at a uniform speed, pen 47 traversing a horizontal graduation on chart 45 each 15 seconds. Any shrinkage which yarn specimen 54 undergoes because of this treatment will rock lever arm 53 and pointer arm 64 in a clockwise direction. The movement of pointer arm 64 causes said pen to be carried to the right since a pin 73 attached to sleeve 48 is engaged by a slot 74 in the upper portion of said pointer arm. The movement described by pen 47 is, therefore, the resultant of the two forces acting on said pen, namely, the relative movement of chart 45 and the clockwise movement of pointer arm 64. The line drawn on chart 45 by said pen, consequently, indicates the degree of shrinkage taking place with respect to time, and, by suitable calibration of said measuring and recording device, the percent shrinkage of the yarn specimen 54 which takes place with time may be read directly. Where the yarn specimen 54 tends to stretch, or both shrink and stretch during the course of a given treatment or series of treatments, the zero point may be placed at the center of chart 45 and pen 47 centered thereon at the start of the operation by loosening clamp 14, shifting chart board 41 the necessary horizontal distance and placing pen 47 at the zero-zero mark in the manner described above. In this way clockwise or counter-clockwise movement of pointer arm 64 will cause pen 47 to record on chart 45 and to indicate the linear changes taking place in yarn specimen 54.

It is to be understood that the foregoing detailed description is given merely by way of illustration and that many variations may be made therein without departing from the spirit of my invention.

Having described my invention, what I desire to secure by Letters Patent is:

1. In a device for determining and recording the linear response of a tensioned filamentary material when subjected to physical and chemical treatments, a supporting member, a bracket slidably mounted thereon for holding one end of a specimen of filamentary material, means for locking said bracket at any position along said supporting member, means for holding the other end of said specimen, means cooperating with said last-mentioned holding means for exerting a variable, predetermined tension on said specimen, means movable in response to linear changes in said specimen when under treatment, and recording means, including a vertically movable chart, cooperating with said linear change responsive means for continuously recording said linear changes relative to elapsed time.

2. In a device for determining and recording the linear response of a tensioned filamentary material when subjected to physical and chemical treatments, a supporting member, a bracket slidably mounted thereon for holding one end of a specimen of filamentary material, means for locking said bracket at any position along said supporting member, means for holding the other end of said specimen, means including a pivotally mounted, counterweighted lever arm responsive to linear changes in said specimen when under treatment, said lever arm cooperating with said last-mentioned holding means for continuously exerting a variable, predetermined tension on said specimen, a pointer arm fixed to said counterweighted lever arm so as to be simultaneously movable in response to linear changes in said specimen during treatment, and recording means, including a vertically movable chart, mounted on said above-mentioned supporting arm cooperating with said pointer arm for continuously recording said linear changes relative to elapsed time.

3. In a device for determining and recording the linear response of a tensioned filamentary material when subjected to physical and chemical treatments, a supporting member, a bracket slidably mounted thereon for holding one end of a specimen of filamentary material, means for locking said bracket at any position along said supporting member, means for holding the other end of said specimen, means including a pivotally mounted, counterweighted lever arm responsive to linear changes in said specimen when under treatment, said lever arm cooperating with said last-mentioned holding means for continuously exerting a variable, predetermined tension on said specimen, a pointer arm fixed to said counterweighted lever arm so as to be simultaneously movable in response to linear changes in said specimen during treatment, and recording means, including a vertically movable chart, mounted on said above-mentioned supporting arm including a pen responsive to the movement of said pointer arm and a chart adapted to be moved relative to both said pen and pointer arm for continuously recording said linear changes relative to elapsed time.

JOHN B. STEIDING.

REFERENCES CITED

The following references are of record in the file of this patent:

UNITED STATES PATENTS

| Number | Name | Date |
|---|---|---|
| 1,184,034 | Sott | May 23, 1916 |
| 1,324,470 | Scott | Dec. 9, 1919 |
| 1,837,577 | Nessler | Dec. 23, 1931 |
| 2,164,993 | Lewis | July 4, 1939 |
| 2,259,491 | Roller | Oct. 21, 1941 |